United States Patent [19]

Cook, Jr. et al.

[11] Patent Number: 5,062,235
[45] Date of Patent: Nov. 5, 1991

[54] ARTIFICIAL BAIT FOR FISH AND SHELLFISH

[75] Inventors: Harold T. Cook, Jr., Bainbridge Island; Mimi S. Fielding, Gig Harbor, both of Wash.

[73] Assignee: Marco Seattle, Inc, Seattle, Wash.

[21] Appl. No.: 543,117

[22] Filed: Jun. 22, 1990

[51] Int. Cl.$^5$ ............................................. A01K 85/00
[52] U.S. Cl. ........................................ 43/42; 43/43.53
[58] Field of Search ................... 43/42, 43.53, 42.06, 43/17.6, 44.99; 426/1

[56] References Cited

U.S. PATENT DOCUMENTS

| | | | |
|---|---|---|---|
| D. 256,267 | 8/1980 | Stutzman. | |
| 2,874,048 | 2/1959 | Walldov | 426/104 |
| 3,650,766 | 3/1972 | Smadar | 426/89 |
| 3,684,519 | 8/1972 | Combs | 43/42.06 |
| 4,006,256 | 2/1977 | Kyros | 426/102 |
| 4,117,172 | 9/1978 | Bradshaw et al. | 426/276 |
| 4,119,739 | 10/1978 | Barwick et al. | 426/573 |
| 4,245,420 | 1/1981 | Carr | 43/42.06 |
| 4,347,261 | 8/1982 | Challen et al. | 426/573 |
| 4,463,018 | 7/1984 | Carr | 426/1 |
| 4,576,821 | 3/1986 | Smith et al. | 426/1 |
| 4,666,717 | 5/1987 | Smith et al. | 426/1 |
| 4,731,247 | 3/1988 | Wolford et al. | 426/1 |
| 4,761,910 | 8/1988 | Ninomiyas | 43/42.31 |
| 4,826,691 | 5/1989 | Prochnow | 426/1 |
| 4,828,829 | 5/1989 | Bethshears | 424/84 |
| 4,862,631 | 9/1989 | Wilson et al. | 43/42.33 |
| 4,882,174 | 11/1989 | Burreson et al. | 416/1 |
| 4,901,466 | 2/1990 | Davis | 43/4 |

FOREIGN PATENT DOCUMENTS

| | | |
|---|---|---|
| 1474629 | 8/1974 | Australia. |
| 6255/87 | 9/1987 | Denmark. |
| 0137748 | 4/1985 | European Pat. Off.. |
| 2824042 | 1/1978 | Fed. Rep. of Germany. |
| 55-1784 | 1/1980 | Japan. |
| 57-198053 | 12/1982 | Japan. |
| 59-66845 | 4/1984 | Japan. |
| 59-74937 | 4/1984 | Japan. |
| 81/00016 | 5/1981 | PCT Int'l Appl.. |
| 82/00156 | 9/1982 | PCT Int'l Appl.. |
| 87/01307 | 6/1987 | PCT Int'l Appl.. |
| 1369198 | 11/1970 | United Kingdom. |

OTHER PUBLICATIONS

Yamaguchi, Y., et al., "Effectiveness of Artificial Bait for Obtaining Higher Hooking Rate in Bottom-Set Long-Line Fishing," *Bulletin of the Japanese Society of Scientific Fisheries*, vol. 49, No. 12, pp. 1819–1824 (1983).

Kelco, *Structured Foods With The Algin/Calcium Reaction*, Jan. 1984.

ABBA Newsletter 1986/1987.

*Primary Examiner*—Richard K. Seidel
*Assistant Examiner*—Chuck Y. Mah
*Attorney, Agent, or Firm*—Christensen, O'Connor, Johnson & Kindness

[57] ABSTRACT

An artificial bait comprises short lengths of randomly dispersed fibers, preferably rayon, an internal setting alginate, and attractant dispersed in a water matrix.

17 Claims, No Drawings

ARTIFICIAL BAIT FOR FISH AND SHELLFISH

BACKGROUND OF THE INVENTION

The present invention relates to artificial bait and more particularly to an artificial bait adapted for fishing, and especially commercial fishing.

A variety of artificial fish baits have been developed using a variety of attractants in many delivery matrices. None of the baits developed thus far, however, are especially adapted to commercial fishing, for example long-line fishing where the bait must be secured on a hook and then exposed to a salt water environment for a substantial period of time. Many of the prior artificial baits are not easily applied to a hook, especially when automatic baiting machines are employed to bait the hooks. Additionally, while the bait must remain on the hook for a long period of time upon contact with water, once the hook is retrieved to the fishing boat, the bait must also be easily removable from the hooks. Moreover, the bait must have the capability of allowing a timed release of the attractant from the bait to continuously attract fish to the hook over an extended period of time.

One artificial bait that attempts to meet the foregoing requirements is disclosed in Burreson et al., U.S. Pat. No. 4,882,174, issued Nov. 21, 1989. This patent discloses an artificial bait comprising a mat of randomly crossed fibers of a fibrous material, and a fluid mass of dissolved gelatin or pectin and attractant dispersed throughout the fibrous mat. While the bait is retained reasonably well on a hook, it is sometimes difficult to remove from the hook because the barb becomes caught in the fibrous mat. Moreover, because a fibrous mat is used, it is difficult to formulate and form into the desired shape. For example, it is difficult to thoroughly and evenly mix the mat, gel, and attractant disclosed by Burreson et al. Moreover, the bait of Burreson et al. can only be molded into a desired shape. It cannot be extruded and then cut into desired lengths because of the presence of the fibrous mat. In addition, the Burreson et al. formulation must be heated in order to cause it to set. It is most desirable to manufacture and process a bait at room temperature, not only for ease and economy of handling, but also to avoid thermal degradation of the attractants normally used.

SUMMARY OF THE INVENTION

The desirable attributes of a good artificial bait are provided by the present invention, which comprises an artificial bait including a randomly dispersed fiber, an attractant, and an alginate gel permeable to the attractant when in contact with water. In its preferred form, the bait comprises a mixture of from 4% to 8% alginate gel, from 1% to 4% fiber, from a trace to 40% attractant, 0.5% to 4% of a setting agent for the alginate, the balance of the mixture being water. Prior to setting, the mixture is fluid and can easily be mixed so that the fibers and attractant are evenly distributed throughout the alginate. All the percentages are by weight based on the total composition. It is preferred that the setting agent be the last component added to the mixture after which the mixture is placed in a mold or extruded, and thereafter gelled. The gelled mixture is then packaged for future use.

DETAILED DESCRIPTION OF THE INVENTION

An artificial bait formulated in accordance with the present invention has three primary ingredients: a randomly dispersed bulk fiber, an attractant, and an alginate gel containing the attractant and fiber. The gel is permeable to the attractant when in contact with the water, that is, the attractant can slowly diffuse through the gel so that it, in effect, is released over a relatively long period of time. The alginate is a water soluble material, that can be mixed with the fiber and attractant in an aqueous solution and thereafter caused to gel, thus forming a solid or semi-solid final product. Prior to gelling, the aqueous solution can be placed in a mold. The mold can take any of several forms including one that forms discrete chunks of bait, or preferably, an elongated continuous mold that forms a thin, elongated strip of bait that can be chopped into desired lengths, fed into an automatic baiting machine, and applied to a hook. When in a partially gelled state, the aqueous mixture can also be extruded into an elongated strand of desired cross section. The strand can be coiled and stored, or if desired, can be cut into predetermined lengths for storage and application to a hook.

The fiber employed in the artificial bait in accordance with the present invention provides tensile strength to the bait. Without the fiber, the alginate gel will tend to fracture, especially when being applied to a hook. The fiber is most preferably biodegradable. Thus, if the bait drops from the hook or is ingested by a fish that is not caught, it will degrade without harm to the fish or to the environment. It must also be readily and economically available. Preferably, the fiber is purchased in a randomly dispersed bulk form. Natural cotton can be used, although a synthetic fiber such as rayon is most preferred because the desired fiber size and grade can readily be obtained on a commercial scale. Rayon also provides superior freeze-thaw stability to bait formulated in accordance with the present invention. The rayon actually causes the bait to become stronger after it has been frozen.

It is very important that the size, weight, and amount of fiber employed with the bait of the present invention be strictly controlled. The fiber must have the capability of being evenly distributed throughout the bait mass. It cannot form intertwining balls or ropes and cannot layer into mats. The amount of the fiber must be controlled so that prior to gelling the bait is flowable, mixable into a homogeneous mass, and can also be extruded. It is preferred that the fiber be incorporated into the bait in lengths of less than one and one-half inches, preferably in the range of from one-quarter to one and one-half inches and most preferably on the order of one-half to one inch. If the fibers are longer than one and one-half inches, they tend to form ropes or mats in the bait mixture as it is being prepared. Longer fibers also restrict dispersion of the attractant. It is also preferred that the fineness, or denier, of the fiber be on the order of from three-quarters to three, more preferably from one to two, and most preferably one and one-half.

The gel employed in the artificial bait to carry the attractant and fiber formulated in accordance with the present invention must also meet certain criteria. The gel first must be nontoxic and biodegradable. The gel must also be flowable for purposes of mixing, preferably in an aqueous environment, and of course, must be settable to provide a firm final product. The gel must be inert relative to the attractant, that is, it cannot adversely affect the primary purpose of the attractant. The gel must also have sufficient strength to stay on the hook while yet being relatively easily penetrable by the hook, but ultimately removable from the hook without significant effort. The gel must also have the ability to release the attractant over time upon exposure to water. Importantly, since the bait will be exposed to an aqueous environment, the gel must be substantially water insoluble, while still being sufficiently hydrophilic to allow the attractant to leach out of the gel slowly.

It has been found that alginates best meet the desired characteristics for the gel. In addition, alginates readily bind water, thus providing an inexpensive bulking agent. The alginates when gelled also have a flesh texture, providing an appropriate "feel" for the fish. Alginates have a neutral taste and therefore do not repel the fish. Also, once gelled, the gel cannot be thermally reversed. Thus, heat does not adversely effect the storage characteristics of the bait.

The most preferred gel is commonly referred to as sodium alginate. Sodium alginate is the term normally applied to a linear copolymer composed of two monomeric units, D-mannuronic acid and L-guluronic acid. These copolymers are gelled in the presence of calcium ions. Calcium ions bind to adjacent sections of the alginate copolymer. An extensive discussion of the alginates and their gelling reactions is set forth in a pamphlet entitled *Structured Foods With The Algin/Calcium Reaction*, Technical Bulletin F-83, published by Kelco, 8355 Arrow Drive, San Diego, Calif. 92123, published 1984.

Alginate gels can be set by three different methods: diffusion, internal, and cooling. According to the present invention, it is most preferred to use the internal setting method, which is normally carried out at room temperature. The setting agent is released under controlled conditions from within the system, thus the name internal setting. The preferred setting agents include gypsum, dicalcium phosphate, calcium sulfate, and calcium sulfate dihydrate, with the most preferred being the latter. The rate at which the calcium is made available to the alginate molecules depends primarily on the pH and the amount, particle size, and intrinsic solubility characteristics of the particular calcium salts used. Small particle size and low pH, for example, promote rapid release of the calcium and thus rapid gelling.

It is most preferred that the calcium release be slowed so as to inhibit gel formation and thus allow easier handling of the aqueous solution prior to gelling. For this purpose, a calcium sequestrant is employed to control the gelling reaction by competing with the alginate for calcium ions. Typical sequestrants include sodium hexametaphosphate, tetrasodium pyrophosphate, and sodium citrate. For purposes of the present invention, a sequestrant containing a phosphate ion, and particularly disodium phosphate, is most preferred.

Both natural and synthetic attractants can be employed, although natural attractants are under most circumstances preferred. Natural attractants can include ground herring, squid, and mackerel, either whole or selected parts of those sources. Most preferred is natural fresh herring without the heads, viscera, and tails. Other natural attractants include dried fish meal, natural amino acids, and other organic acids. Synthetic attractants are described in the following publications: Carr et al., "Chemical Stimulation of Feeding Behavior in the Pinfish, Lagodon rhombiodes: A New Approach To An Old Problem", Comp. Biochem, Physiol., Vol. 54A, pp. 161–166 (1976); Carr et al., "Chemical Stimulation of Feeding Behavior in the Pinfish, Lagodon rhombiodes: Characterization and Identification of Stimulatory Substances Extracted From Shrimp" Comp. Biochem, Physiol., Vol. 54A, pp. 437–441 (1976); Carr et al, "Chemoreception and Feeding Behavior in the Pigfish, Orthopristics chrysopterus: Characterization and Identification of Stimulatory Substances in a Shrimp Extract," Compt. Biochem., Physiol., Vol. 55A, pp. 153–137. Both the natural and synthetic attractants can be incorporated into the bait in accordance with the present invention in either liquid or solid form.

Optional ingredients can also be employed in the artificial bait formulated in accordance with the present invention. These ingredients can include conventional preservatives and humectants.

A preferred embodiment of artificial bait can be formulated in accordance with the present invention by incorporating the principal ingredients in the following proportions:

| Ingredient | Preferred Range | Most Preferred Range |
|---|---|---|
| fiber | 1% to 4% | 2% to 3% |
| alginate | 4% to 8% | 5% to 7% |
| setting agent | 0.5% to 4% | 2% to 3.5% |
| sequestrant | 0.1% to 3% | 1% to 2% |
| attractant | trace to 40% | 10% to 30% |
| optional ingredients | 0.0 to 10% | 0% to 5% |
| water | balance | balance |

The percentages used in the foregoing table are by weight based upon the total weight of the composition including water.

EXAMPLE

The following example is intended to illustrate to one of ordinary skill how to prepare an artificial bait in accordance with the invention disclosed herein. This example is not included as a of limitation but only exemplification.

An artificial bait is formulated in accordance with the present invention by placing 64.3 parts by weight water into a mixing container. Preferably deionized water or at least decalcified water is used. Rayon fibers having a length of one-half inch and a denier of one and one-half in the amount of 2.4 parts by weight are placed in the water. A gel mixture composed of 5.9 parts by weight of sodium alginate and 1.3 parts by weight sodium phosphate are also placed in the water. Attractant comprising ground herring without heads, viscera, or tails is also placed in the water in the amount of 20 parts by weight. The mixture is thoroughly stirred to ensure that the attractant and the fibers are completely randomly dispersed throughout the mixture. Thereafter an aqueous solution of setting agent comprising 2.7 parts by weight of calcium sulfate and 3.4 parts by weight of water are added to the mixture. The mixture is thereafter poured in a mold and allowed to set. The mixture sets in approximately one to three minutes. Thereafter the material is taken from the mold and frozen.

The bait prepared in accordance with the present invention can be stored for long periods of time when frozen. The bait needs to be removed from the freezer only a few hours before use and allowed to thaw at room temperature. Once thawed, the bait can be placed on a hook and the hook set.

The present invention has been described in connection with preferred embodiments thereof. It is intended that one of ordinary skill can effect various alterations, substitutions of equivalents, and other changes without departing from the broad concepts disclosed herein. It is therefore intended that the Letters Patent granted hereon be limited only by the definition contained in the appended claims and the equivalents thereof.

The embodiments of the invention in which an exclusive property or privilege is claimed are defined as follows:

1. A method for making an artificial bait comprising: forming a mixture of the following proportions:

| | |
|---|---|
| alginate | 4% to 8% |
| fiber | 1% to 4% |
| attractant | trace to 40% |
| setting agent | 0.5% to 4% |
| water | balance | all percentages being by weight based on the total weight of the composition;
forming the resulting mixture into a shape and allowing said mixture to gel.

2. The method of claim 1 wherein the alginate is combined with a setting agent containing calcium ions.

3. The method of claim 2 further comprising a sequestrant for said calcium ions.

4. The method of claim 3 wherein said sequestrant contains phosphate ions.

5. The method of claim 1 wherein said mixture has the following proportions:

| | |
|---|---|
| alginate | 5% to 7% |
| fiber | 2% to 3% |
| attractant | 10% to 30% |
| setting agent | 2% to 3.5% |
| sequestrant | 1% to 2% |
| water | balance. |

6. The method of claim 1 wherein said alginate is sodium alginate.

7. The method of claim 6 wherein said setting agent is selected from calcium sulfate, calcium sulfate dihydrate, gypsum, or dicalcium phosphate.

8. The method of claim 7 wherein said sequestrant is selected from sodium hexametaphosphate, tetrasodium pyrophosphate, sodium citrate, or mixtures thereof.

9. The method of claim 1 wherein said fiber is rayon.

10. The method of claim 9 wherein said fiber has a length of less than one and one-half inches and a fineness of less than three denier.

11. The method of claim 10 wherein said length of said rayon fiber is between one-quarter inch and one and one-half inches.

12. The method of claim 11 wherein the length of said rayon fiber is about one-half inch.

13. The method of claim 12 wherein said fineness is between three-quarters and three denier.

14. An artificial bait comprising:
an attractant;
an alginate gel permeable to said attractant when in contact with water; and
short fibers randomly and evenly dispersed throughout the gel, the fibers being present in an amount sufficient to provide strength to the gel while allowing the gel, attractant, and fibers to be readily mixable to form a mixture and flowable prior to gelling of the gel, said mixture further comprising a setting agent and water, the components being present in the following proportions:

| | |
|---|---|
| alginate | 4% to 8% |
| fiber | 1% to 4% |
| attractant | trace to 40% |
| setting agent | 0.5% to 4% |
| water | balance. | all percentages by weight based on the total weight of the composition.

15. The bait of claim 14 wherein the proportions are:

| | |
|---|---|
| alginate | 5% to 7% |
| fiber | 2% to 3% |
| attractant | 10% to 30% |
| setting agent | 2% to 3.5% |
| water | balance |

16. The method of claim 15 wherein the alginate is combined with a setting agent containing calcium ions.

17. The bait of claim 16 further comprising 1% to 2% of a sequestrant for calcium ions.

* * * * *